US011931608B1

(12) United States Patent
Gray et al.

(10) Patent No.: US 11,931,608 B1
(45) Date of Patent: Mar. 19, 2024

(54) SYSTEM FOR DISPENSING FLAME RETARDANT FOAM ON EXTERIOR OF A STRUCTURE

(71) Applicant: UIPCO, LLC, San Antonio, TX (US)

(72) Inventors: Emily Margaret Gray, San Antonio, TX (US); Brian Francisco Shipley, Plano, TX (US); Justin Dax Haslam, San Antonio, TX (US); Robert Wiseman Simpson, Fair Oaks Ranch, TX (US); Donnette Moncrief Brown, San Antonio, TX (US); Eric David Schroeder, San Antonio, TX (US); Michael J. Maciolek, Boerne, TX (US); Bobby Lawrence Mohs, San Antonio, TX (US); Manfred Amann, San Antonio, TX (US); Rochelle Ann Tijerina, San Antonio, TX (US); Meredith Beveridge, San Antonio, TX (US); Jess W. Gingrich, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 18/158,877

(22) Filed: Jan. 24, 2023

Related U.S. Application Data

(62) Division of application No. 16/887,690, filed on May 29, 2020, now Pat. No. 11,596,818.

(Continued)

(51) Int. Cl.

| | |
|---|---|
| ***A62C 3/02*** | (2006.01) |
| ***A62C 5/02*** | (2006.01) |
| ***A62C 35/02*** | (2006.01) |

(52) U.S. Cl.
CPC ............ *A62C 3/0214* (2013.01); *A62C 5/022* (2013.01); *A62C 35/023* (2013.01)

(58) Field of Classification Search
CPC ....... A62C 3/0214; A62C 3/0292; A62C 3/02; A62C 3/023; A62C 3/022; A62C 35/62;
(Continued)

(56) References Cited

U.S. PATENT DOCUMENTS 4,991,657 A 2/1991 LeLande, Jr.
5,623,995 A * 4/1997 Smagac ............ B01F 25/43161 169/30

(Continued)

OTHER PUBLICATIONS

Non Final Office Action dated Aug. 2, 2022 for U.S. Appl. No. 16/887,690.

(Continued)

*Primary Examiner* — Christopher R Dandridge
(74) *Attorney, Agent, or Firm* — Plumsea Law Group, LLC

(57) ABSTRACT

A system for dispensing flame retardant foam on the exterior of a structure. The structure has an opening that enables distribution of flame retardant foam onto the roof. The system includes a foam distribution system having a foam expansion chamber and a roof plenum for delivery through the roof opening. Foam solution and compressed air are combined in a conduit and supplied to the foam expansion chamber. The structure may have at least one wall. In that case, the system may have a wall plenum for delivery of flame retardant foam from the foam expansion chamber through a first wall-associated opening. Each such wall will have an opening associated with the wall that enables distribution of flame retardant foam onto that wall.

20 Claims, 7 Drawing Sheets

Related U.S. Application Data

(60) Provisional application No. 62/855,292, filed on May 31, 2019.

(58) Field of Classification Search
CPC ....... A62C 31/12; B01F 23/291; B05B 15/74; Y10S 261/26
See application file for complete search history.

(56) References Cited

U.S. PATENT DOCUMENTS

| | | | | |
|---|---|---|---|---|
| 6,523,616 | B1 | 2/2003 | Wallace | |
| 7,886,837 | B1 * | 2/2011 | Helfgott | A62C 35/68 169/5 |
| 9,619,996 | B1 * | 4/2017 | Smith | G08B 27/001 |
| 11,311,758 | B2 | 4/2022 | Vandemark | |
| 2010/0000743 | A1 * | 1/2010 | Cohen | A01G 25/167 169/5 |
| 2013/0280535 | A1 | 10/2013 | Maas | |
| 2015/0238789 | A1 * | 8/2015 | Johnson | A62C 35/58 169/16 |
| 2019/0299037 | A1 | 10/2019 | Foerg | |

OTHER PUBLICATIONS

Notice of Allowance dated Nov. 14, 2022 for U.S. Appl. No. 16/887,690.
Non Final Office Action dated Nov. 18, 2022 for U.S. Appl. No. 16/940,765.

* cited by examiner

SYSTEM FOR DISPENSING FLAME RETARDANT FOAM ON EXTERIOR OF A STRUCTURE

CROSS-REFERENCE TO RELATED APPLICATIONS

This application is a Divisional of U.S. application Ser. No. 16/887,690 filed May 29, 2020 and titled "System For Dispensing Flame Retardant Foam On Exterior Of A Structure," which is incorporated by reference herein in its entirety.

U.S. application Ser. No. 16/887,690 in turn claims the benefit of U.S. Provisional Patent Application No. 62/855,292 filed May 31, 2019, and titled "System For Dispensing Flame Retardant Foam On Exterior Of A Structure," which is incorporated by reference herein in its entirety.

BACKGROUND OF THE INVENTION

1. Field of the Invention

The present disclosure relates to a system for dispensing flame retardant to cover a structure. In particular, the disclosure relates to a system for distributing flame retardant material to exterior walls of a house.

2. Description of Related Art

Destruction of buildings by fire from the outside is becoming more prevalent. The number of wild fires per year is increasing as people make greater use of developed and undeveloped areas of natural spaces. Both business, such as forestry, and personal use, such as hunting and camping, contribute to the number of fires used in natural such outdoor spaces. With an increase in the number of users comes additional pressures upon the land, both in increased fire risk but also by increased numbers of less-well trained and inexperienced users makes even a small fire a dangerous one.

Global warming also in contributes to the danger of fires in outdoor spaces by drying the fuel sources and strengthening of storm winds, thus increasing the intensity of a fire. Wild fires tend to burn hotter, sending embers high into the wind. Thus, embers are transported farther than they have been in the past, and are distributed into a larger area. As these hotter embers and smoke are carried further, they impinge upon more and more inhabited areas. Denser habitation means denser building, and more chance of building fires.

Defense against wild fires is difficult. Many such fires burn in areas devoid of roads. Further, such natural spaces often are devoid of on-demand water sources, such as hydrants, and there often are but few people present to fight a fire. Many structures are uninhabited for months at a time. Also, such fires may burn undetected, and so become well-established and difficult to extinguish.

The burning of buildings in wild fires is practically inevitable. Thus, there is a need in the art for a system and method that addresses the shortcomings of the prior art discussed above.

SUMMARY OF THE DISCLOSURE

In one aspect, the disclosure provides a system for retarding flame initiating outside of a structure having at least one roof, wherein the structure includes a foam chemical storage container, the foam chemical storage container in fluid communication with a roof plenum having at least one roof opening that enables distribution of flame retardant foam onto the outer surface of the roof.

In particular, the disclosure provides a system for retarding flame initiating outside of a structure having a roof. The structure also may have at least one wall. The structure has an opening that enables distribution of flame retardant foam onto an outer surface of the roof. Each wall may have an opening associated with the wall that enables distribution of flame retardant foam onto an outer surface of that wall.

The system includes a foam distribution system having a foam expansion chamber in fluid communication with a first roof plenum for delivery of flame retardant foam through the first roof opening to an outer surface of the roof. Similarly, the system may have a first wall conduit for carrying flame retardant foam from the foam expansion chamber to a first wall plenum for delivery of flame retardant foam through a first wall-associated opening.

The system also includes a foam generation system. The foam generation system comprises a foam chemical storage container in fluid communication with a foam solution storage container, and a water supply to the foam solution container.

The foam generation system also includes a system control module that controls a first compressed air line to the system control module. The system control module also controls a first foam solution conduit from the foam solution storage container to the system control module to control air flow in second compressed air line. The controlled air from the second compressed air is used to provide a first compressed air flow and to control foam solution flow in second foam solution conduit in response to an electrical control from an electrical control unit. The electrical control unit is controlled by a communication line and a power supply line.

The first foam solution and the first compressed air flow are combined in a conduit and supplied to the foam expansion chamber through a supply conduit.

In another aspect, the disclosure provides a method for suppressing fire in a structure having a roof. The structure may have at least one wall. In accordance with the method, a foam solution and water are combined to form dilute solution. Air is introduced into the dilute solution. Flame retardant foam is made by introducing the dilute solution and air into an expansion chamber.

Further in accordance with the method, foam is supplied to a plenum for each surface to be protected. Flame retardant foam is dispersed or distributed onto an outer surface of the roof. Flame retardant foam also may be dispensed onto an outer surface of a wall through an opening in the plenum associated with that surface.

In yet another aspect, the disclosure provides a method for suppressing fire in a structure having a roof. The structure also may have at least one wall. Flame retardant foam is supplied to a plenum for each surface to be protected. Information about the fire is gathered, including information related to activation of neighboring fire suppression systems and information from system sensors. The information is used to generate a decision to activate the system without human intervention or manually instructing the system to activate and distributing flame retardant foam onto the roof and onto each wall through an opening in the plenum associated with that surface in response to an instruction to activate the fire suppression foam system.

Other systems, methods, features, and advantages of the disclosure will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

In one aspect, the disclosure provides a system for retarding flame initiating outside of a structure having at least one roof, wherein the structure includes a foam chemical storage container, the foam chemical storage container in fluid communication with a roof plenum having at least one roof opening that enables distribution of flame retardant foam onto the outer surface of the roof.

In particular, the disclosure provides a system for retarding flame initiating outside of a structure having a roof. The structure also may have at least one wall. The structure has an opening that enables distribution of flame retardant foam onto an outer surface of the roof. Each wall may have an opening associated with the wall that enables distribution of flame retardant foam onto an outer surface of that wall.

The system includes a foam distribution system having a foam expansion chamber in fluid communication with a first roof plenum for delivery of flame retardant foam through the first roof opening to an outer surface of the roof. Similarly, the system may have a first wall conduit for carrying flame retardant foam from the foam expansion chamber to a first wall plenum for delivery of flame retardant foam through a first wall-associated opening.

The first foam solution and the first compressed air flow are combined in a conduit and supplied to the foam expansion chamber through a supply conduit.

In some embodiments, walls may not be present. In other embodiments, walls may be present, but may not be fitted with foam distribution in accordance with the system of the disclosure. In still other embodiments, only selected walls may be fitted with foam distribution in accordance with the system of the disclosure. In yet additional embodiments, all walls may be protected in accordance with the system of this disclosure. For ease of description herein, the disclosure will describe a system having at least one wall and in which all walls present are treated with flame retardant foam in accordance with the system disclosed herein.

Further, for ease of description herein, the description and claims are directed to use of flame retardant foam. However, other compositions, such as gels, that have the same relevant properties and characteristics as foam also may be used in accordance with this description. For example, flame retardant gels may be used in embodiments. Such flame retardant gels are of the type that will have flame retardant effect, will flow down the surfaces to be protected, can be distributed with essentially the same type of distribution system, and which typically may be compactly stored in a concentrated form and diluted for use, stored suitably may be used.

Figure 1:
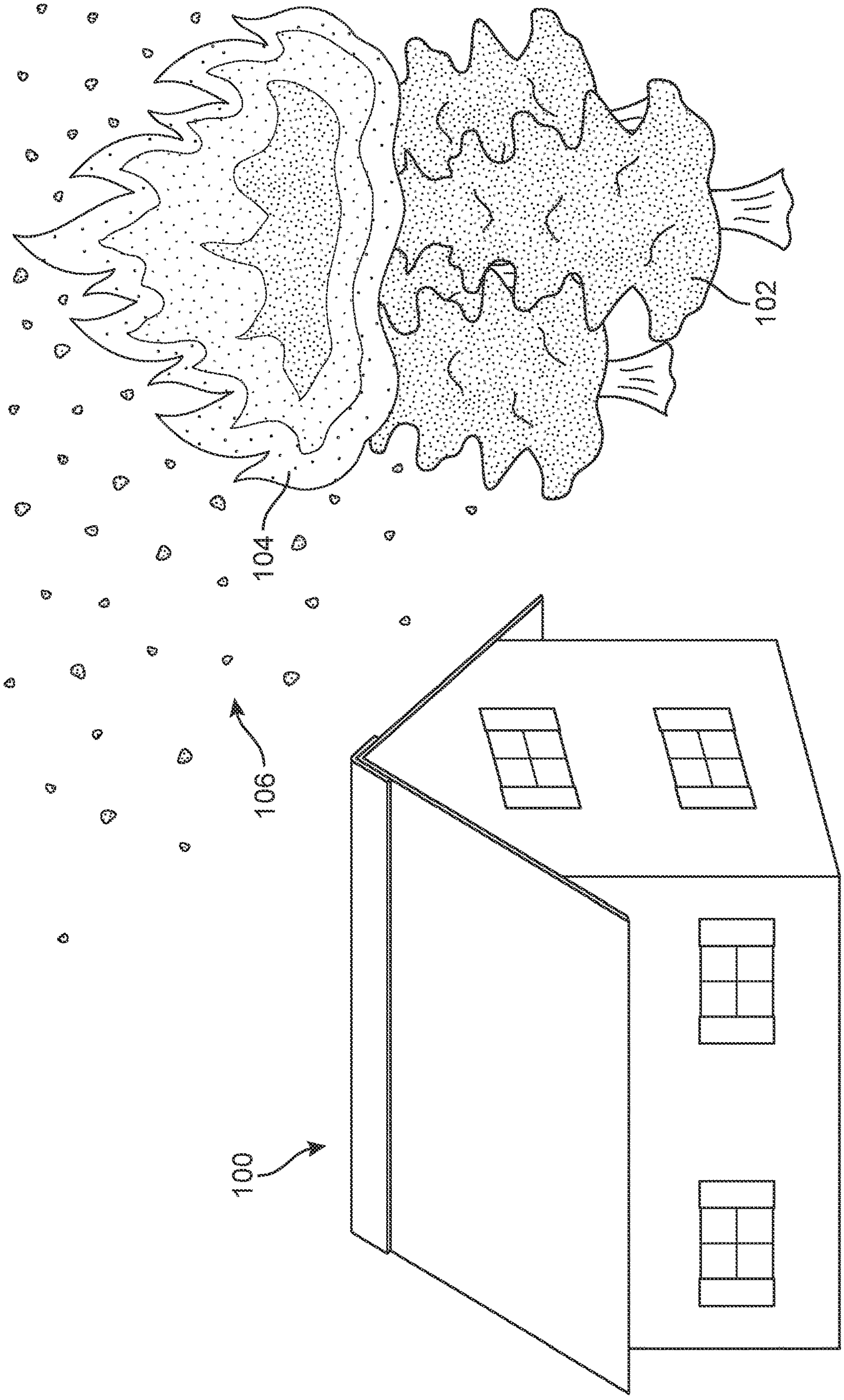
FIG. 1 is a depiction of a wild fire near a structure.

FIG. 1 schematically illustrates a wild fire near a structure having a roof and at least one wall. Trees 102 are engulfed in flames 104, as would occur in a wild fire. Fire 104 generates embers 106, which are sufficiently hot to start their own fire. Embers 106 are carried away from fire 104 and toward structures, such as structure 100, by the wind, air convections caused by the heated air, and other air phenomena. Whereas structure 100 may depict a home, other buildings, such as garages, shelters, and lean-tos that have a roof, also may utilize systems of the disclosure.

Figure 2:
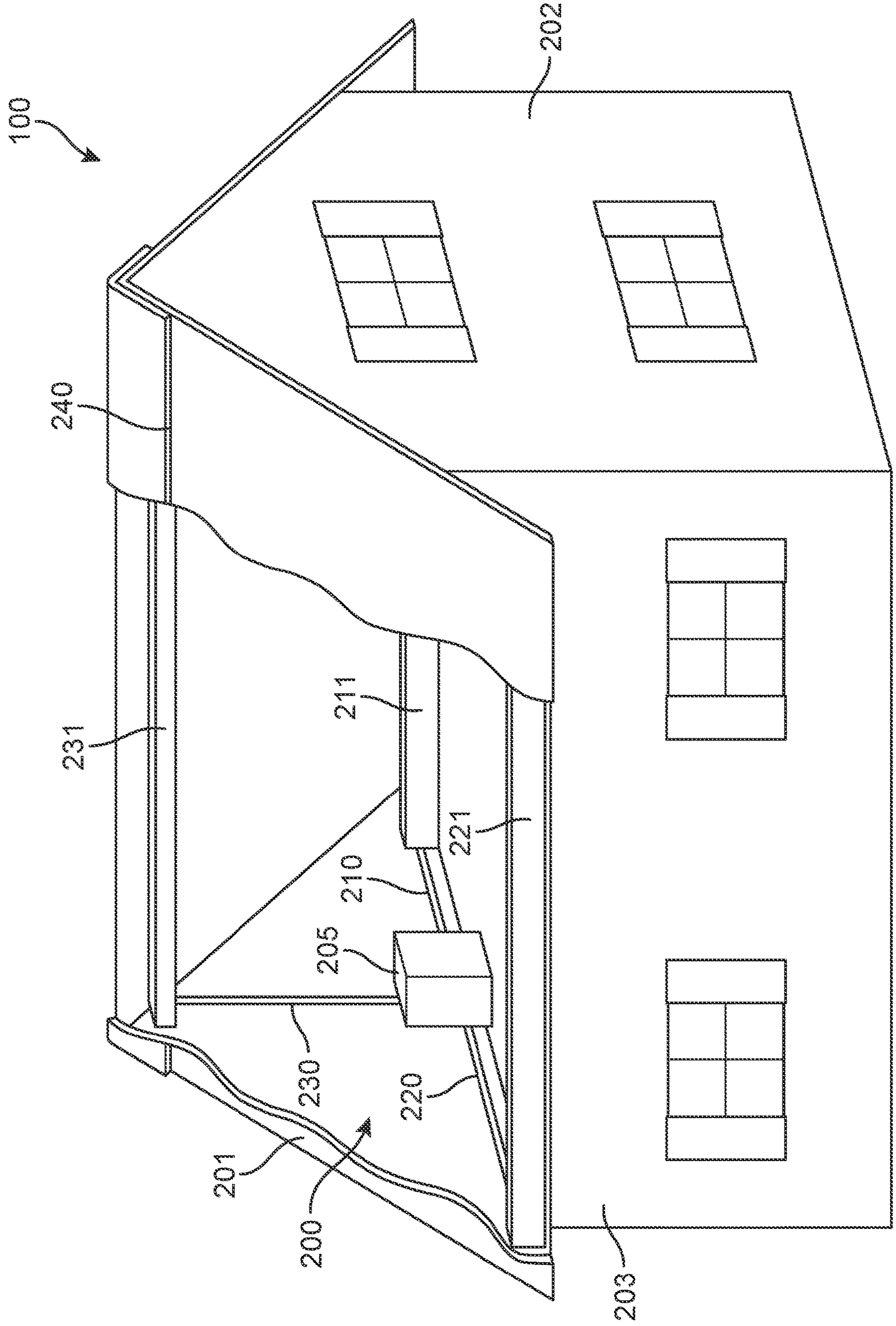
FIG. 2 is a cut-away diagram of an embodiment of the disclosure.
Figure 3:
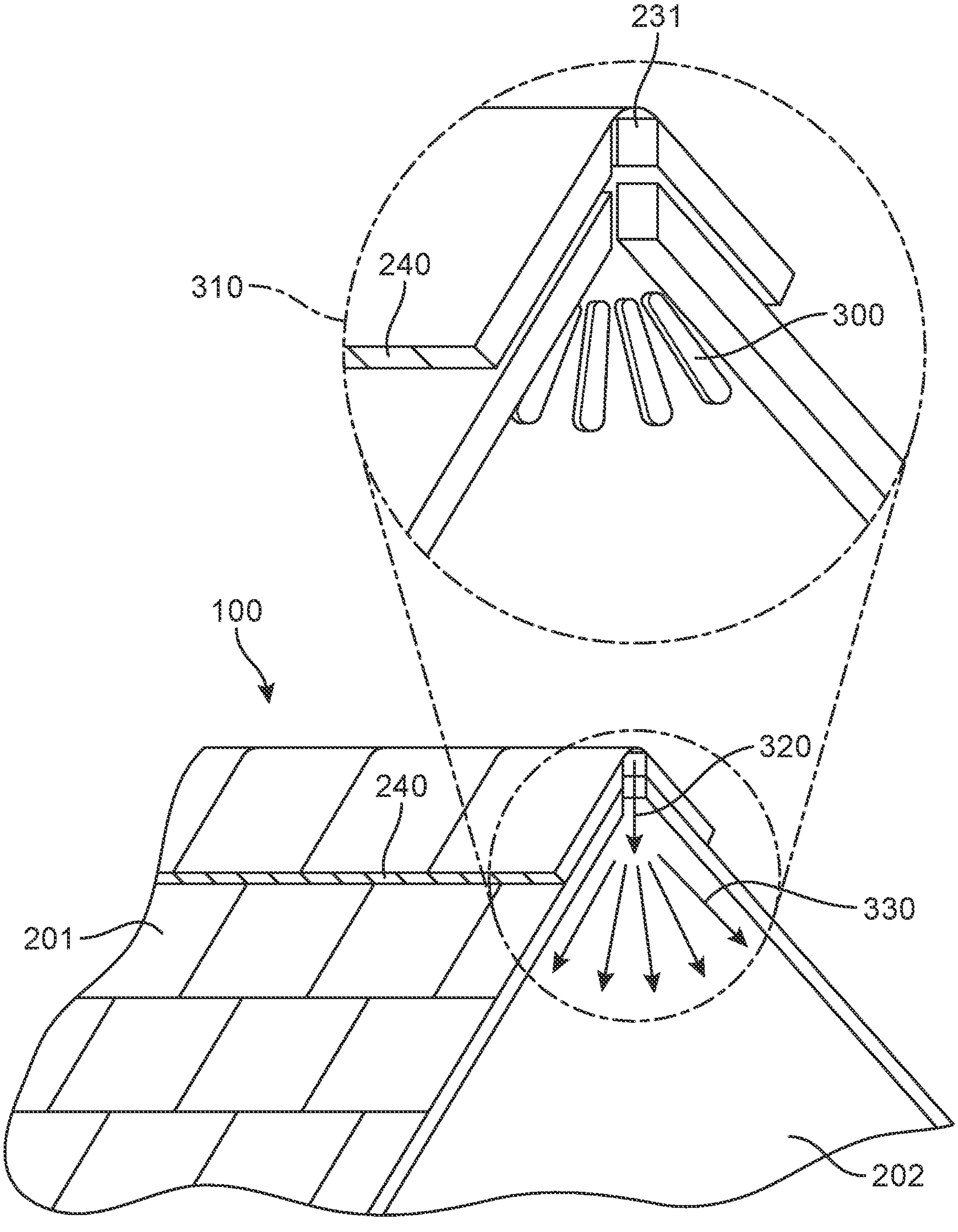
FIG. 3 is an illustration of representative foam distributors of the disclosure.
Figure 4:
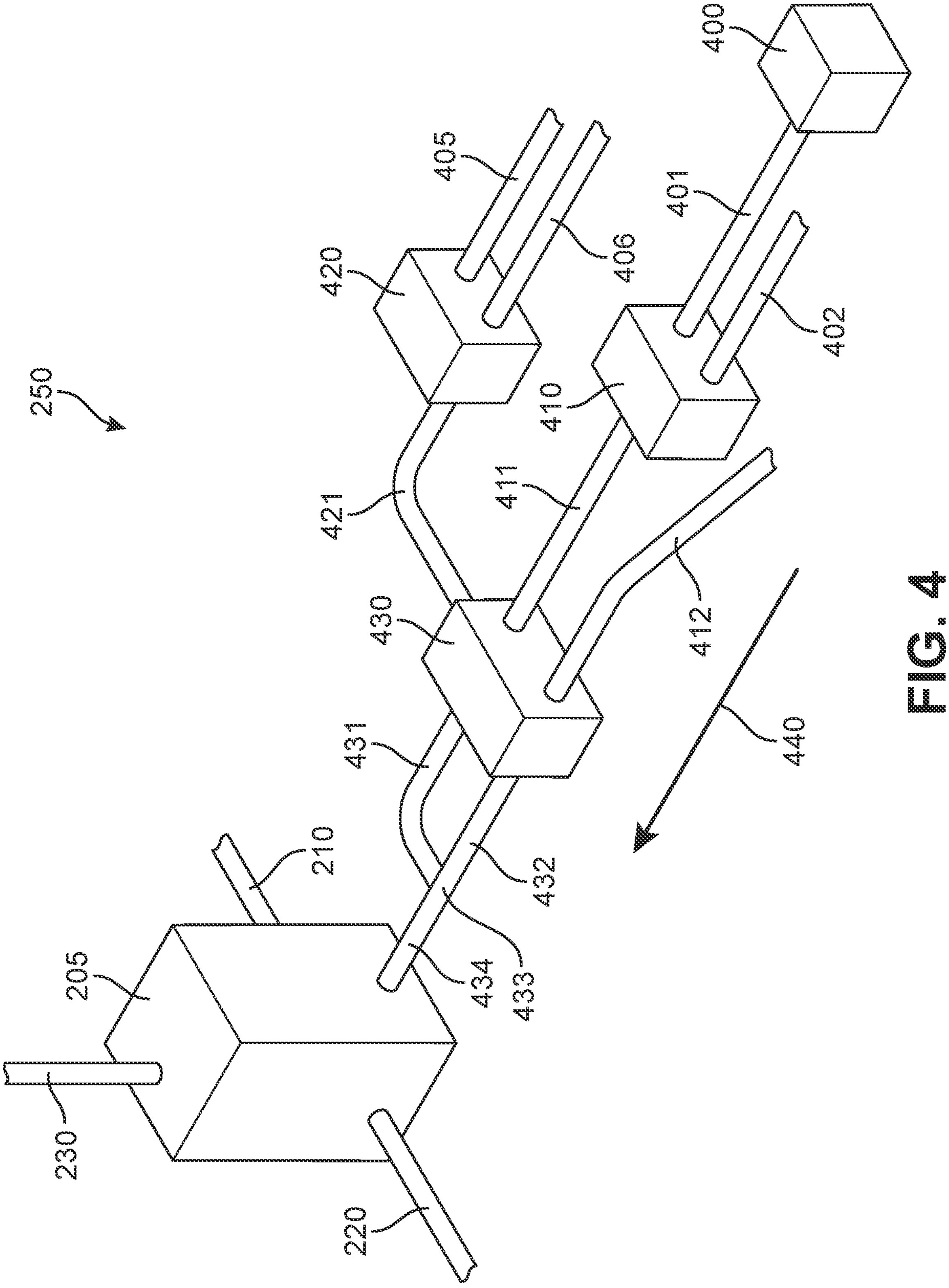
FIG. 4 is a schematic view of a foam generation system of the disclosure.
Figure 5:
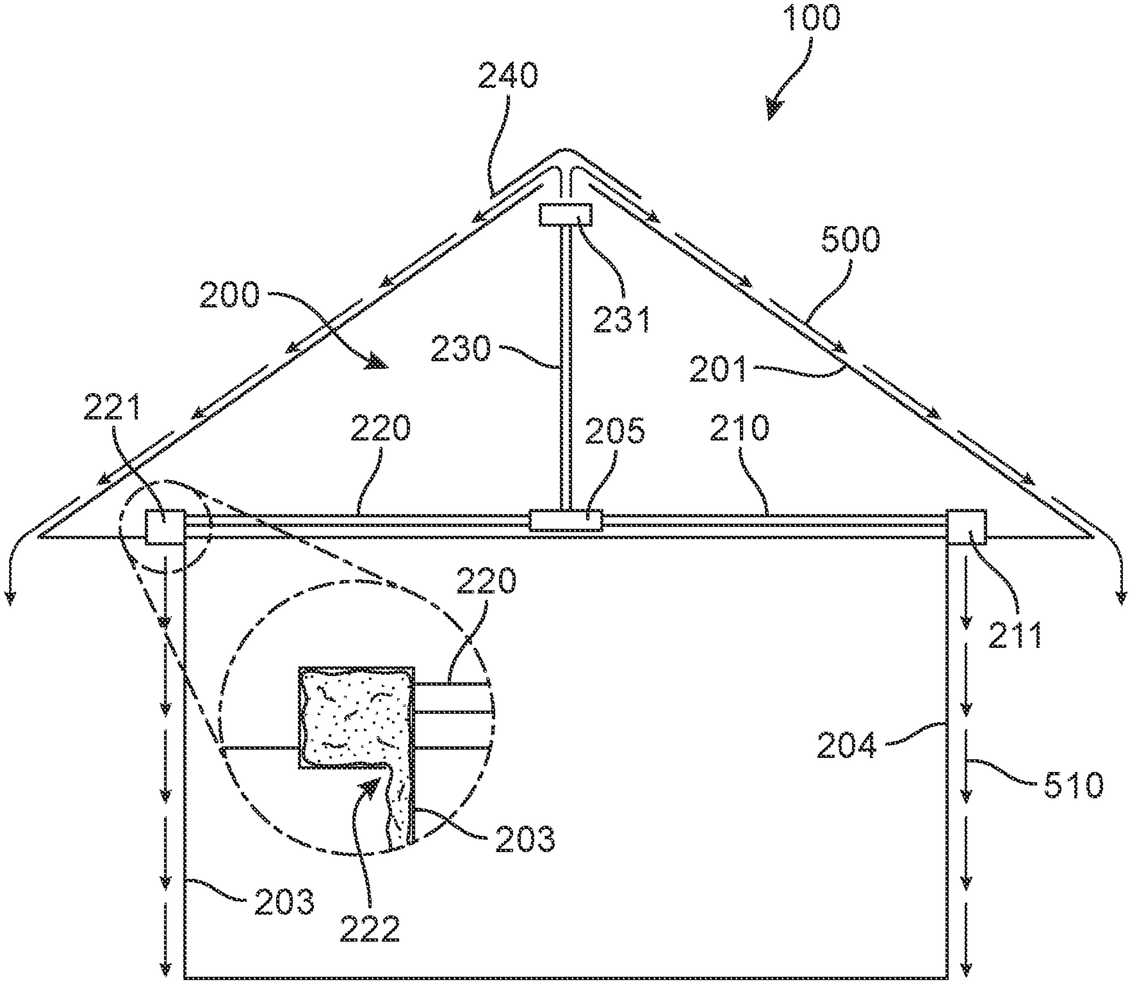
FIG. 5 is a schematic view of a foam distribution system of the disclosure.
Figure 7:
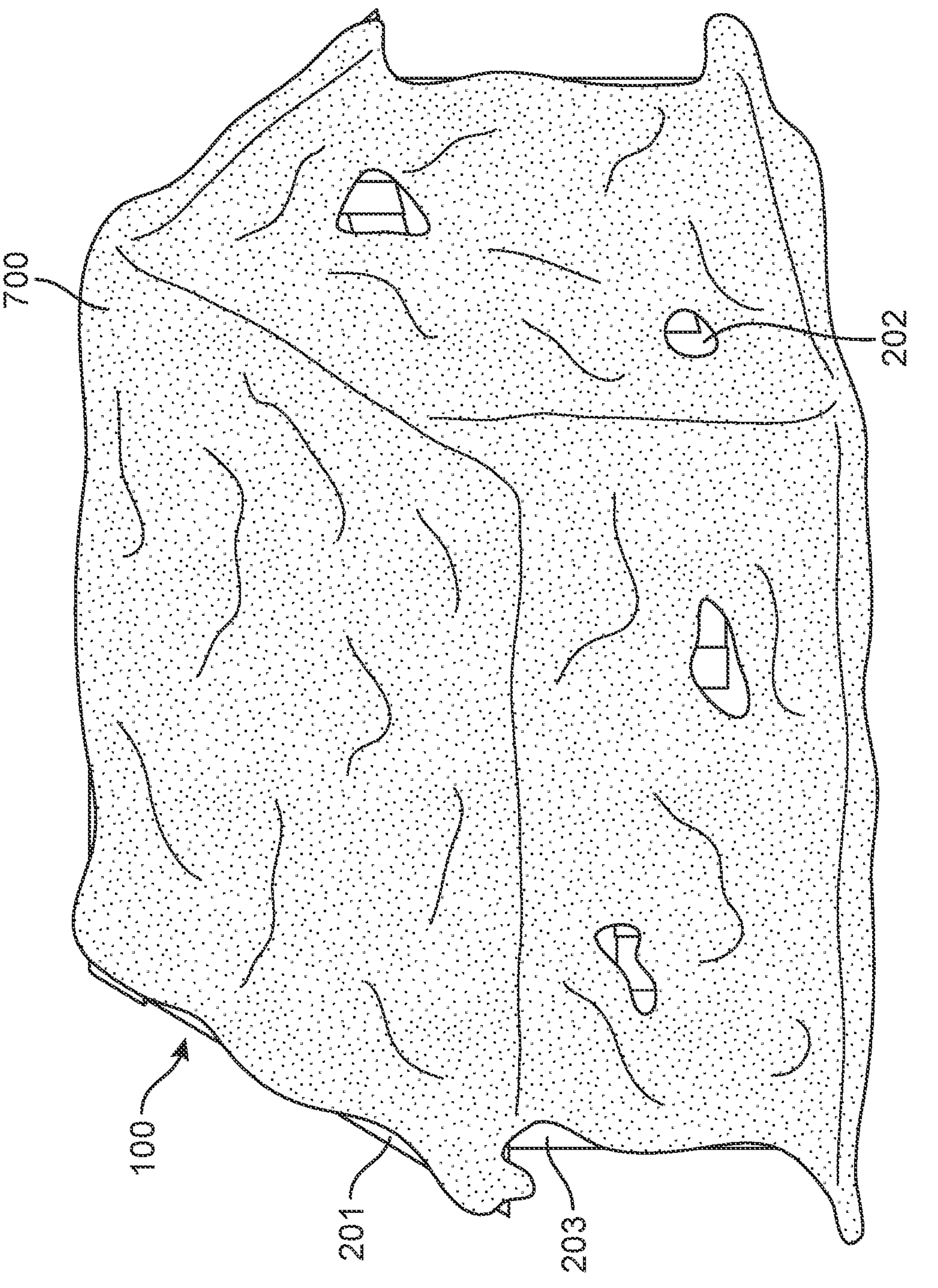
FIG. 7 is a schematic illustration of a structure onto which flame retardant foam has been dispersed.

An embodiment of a flame retardant foam dispensing system as disclosed herein is illustrated in FIG. 2, FIG. 3, FIG. 4, and FIG. 5. FIG. 7 illustrates home 100 covered in foam 700 on all outer surfaces, including roof 201, wall 202, and wall 203. FIG. 2 is a cut-away depiction of a structure having a peaked roof and four walls, only two of which can be seen in the drawing. House 100 includes roof 201, first wall 202, and second wall 203. In embodiments, foam distribution system 200 is seen in what may be called the attic area of the structure, above the ceiling of the room below. Foam distribution system 200 includes foam expansion chamber 205, from which flame retardant foam is distributed when appropriate to provide flame retardant protection. Foam is flowed from foam expansion chamber 205 through first conduit 210 to first soffit plenum 211. In some embodiments, flame retardant foam may be released from first soffit plenum 211 to cover an outer surface of a wall (see FIG. 5) through an opening in soffit plenum 211. This opening thus is associated with wall 204. Similarly, foam flows from foam expansion chamber 205 through second conduit 220 to second soffit plenum 221. As shown in FIG. 5, when released, foam flows from opening 222 in second soffit plenum 221 and down an outer surface of wall 203. Opening 222 thus is associated with wall 203.

In some embodiments, foam is delivered from a ridge plenum to an outer surface of a wall that extends above the level of the soffit plenums. In some embodiments, foam flows from foam expansion chamber 205 through third conduit 230 to ridge plenum 231, as illustrated in FIG. 2. In some embodiments, ridge plenum 231 serves to supply both ridge vent 240 and wall 202, as illustrated in FIG. 3. As shown in FIG. 3, some embodiments have an opening in ridge plenum 231 through wall 202. In these embodiments, foam is delivered directly to an outer surface at the top of wall 202.

FIG. 3 illustrates this embodiment of the disclosure. An upper corner of roof 201 of house 100 is shown in FIG. 3. In this embodiment, ridge vent 240 extends longitudinally along the peak of the roof 201. When required, flame retardant foam will flow from ridge plenum 231 to and through ridge vent 240 to deliver flame retardant foam to an outer surface of the roof. Ridge plenum 231 also will deliver flame retardant foam to and through wall 202, where it will flow under the influence of gravity in the downward direction, in accordance with direction arrow 320.

In such embodiments, as shown in FIG. 3, foam exiting ridge plenum 231 and coating an outer surface of wall 202 will flow in the direction of motion arrows 330. Whereas gravity will keep solution flowing downwardly, it would be preferable to spread the foam laterally across the entirety of wall 202. Therefore, divider 300, as can be seen in enlarged view 310 of FIG. 3, causes the foam to be distributed across the face of wall 202 as it flows in the direction of direction arrows 330. Other shapes and configurations of divider 300 may be used. Additional dividers also may be placed elsewhere on an outer surface of the wall if necessary.

FIG. 5 illustrates an embodiment of the disclosure wherein flame retardant foam is being applied to a structure to coat the structure. FIG. 5 illustrates house 100 and a foam distribution system 200 therein. Foam expansion chamber 205 is supplying first soffit plenum 211 through first conduit 210. Similarly, foam expansion chamber 205 is supplying second soffit plenum 221 through second conduit 220, and is supplying ridge plenum 231 through third conduit 230.

As illustrated in the embodiment depicted in FIG. 5, foam flows from roof plenum 231 through ridge vent 240 onto an outer surface of roof 201. Foam flows by gravity down an outer surface of the roof in the direction illustrated by direction arrow 500. Foam also flows by gravity from second soffit plenum 221 through opening 222 in the bottom of second soffit plenum 221 and onto an outer surface of wall 203, where if flows under the influence of gravity in the direction of direction arrow 510.

In some embodiments, the system also includes a foam generation system. FIG. 4 illustrates an embodiment of a foam generation system 250. Foam generation system 250 comprises foam chemical storage container 400, foam solution storage container 410, and conduit 401 for carrying foam chemical from chemical storage container 400 to foam solution storage container 410. Water supply conduit 402 supplies water to foam solution container 410. The direction of flow of these and other flowing materials is in the direction of direction arrow 440.

In some embodiments, foam generation system 250 also includes system control module 430 that controls first compressed air line 412 to system control module 430. System control module 430 receives instructions from electrical control unit 420 by way of conduit 421. System control module 430 also controls flow from first foam solution conduit 411 from foam solution storage container 410 to system control module 430 to control air flow in second compressed air line 432. Controlled air 433 from the second compressed air line 432 is used to provide a first compressed air flow and to control foam solution flow in second foam solution conduit 431 in response to an electrical control from an electrical control unit 420. Electrical control unit 420 is controlled by communication line 405 and power supply line 406.

In some embodiments, second foam solution 411 and second compressed air flow 412 are combined in a conduit 433 and supplied to foam expansion chamber 205 through a supply conduit 434.

Figure 6:
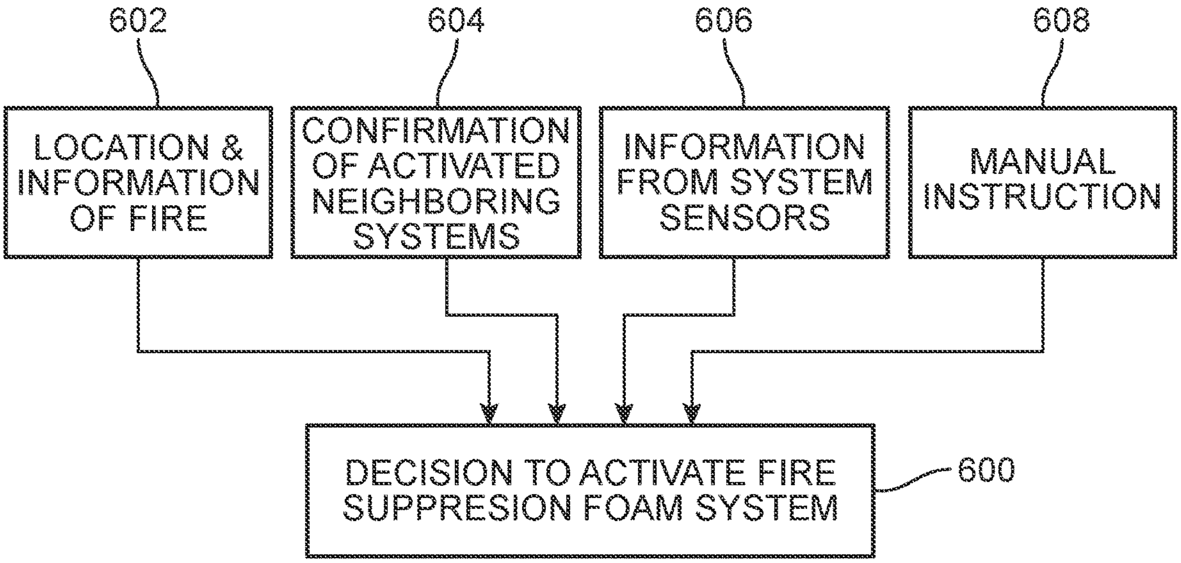
FIG. 6 is a schematic diagram of a method of the disclosure.

In some embodiments, communication line 405 carries instructions from a variety of sensors or controls (not shown) to activate or otherwise control the system. FIG. 6 illustrates an embodiment of the disclosure. As shown in FIG. 6, various factors may be considered in making a decision to activate the fire suppression foam system, as shown at 600. These factors may be sensed or identified remotely or on site.

For example, in some embodiments, a person present at structure 100 may become aware of a fire and may activate the system simply by pushing a button, as illustrated at 608. In some embodiments, one may be aware of a fire elsewhere in the region. The fire may be large or small, and may be moving relative to house 100. Such information may be considered at step 602. Some embodiments may be linked directly to other systems in the locale, and may be instructed to start if it is found that these systems are operating, as in step 604. In some embodiments, both fire-related information and status of systems in the local may be considered simultaneously. The system may be started automatically or with human intervention.

In some embodiments, on-site sensors, or system sensors, may be empowered to start the system, particularly under circumstances independent of human intervention. Such sensors may measure ambient temperature, light (color/wavelength and, under some embodiments, time of day), wind velocity, and any other relevant condition. For example, light that is present when the area should be dark may be an indication of fire and may be considered when determining whether to activate the system.

In another aspect, in some embodiments, the disclosure provides a method for suppressing fire in structure 100 having roof 201 and at least one wall 202. As illustrated in embodiments of the disclosure illustrated in FIG. 1 through FIG. 7, in accordance with the method, foam solution 401 and water 402 are combined to form dilute solution 431. Compressed air 432 is introduced into the dilute solution 431 at 433. Flame retardant foam is made by introducing the combination of dilute solution and compressed air 433 into expansion chamber 205.

Further in accordance with embodiments of the method, foam is supplied through a conduit to a plenum for each surface to be protected. In embodiments, foam is carried through first conduit 210 to first soffit plenum 211; through second conduit 220 to second soffit plenum 221; and through third conduit 230 to ridge plenum 231. Flame retardant foam is dispersed or distributed onto an outer surface of the roof 201 through ridge vent 240; and onto an outer surface of each wall through an opening in the plenum associated with that surface, as described herein. For example, in some embodiments, foam will flow from first soffit plenum 211 through openings in the bottom thereof and onto an outer surface of third wall 204.

In yet another aspect, the disclosure provides a method for suppressing fire in structure 100 having roof 201 and at least one wall 202. In embodiments, foam is carried through first conduit 210 to first soffit plenum 211; through second conduit 220 to second soffit plenum 221; and through third conduit 230 to ridge plenum 231. Flame retardant foam is dispersed or distributed onto the roof 201 through ridge vent 240; and onto each wall through an opening in the plenum associated with that surface, as described herein.

In some embodiments, a decision whether to activate the system is made by gathering information about the fire, including information related to activation of neighboring fire suppression systems and information from system sensors, as depicted in FIG. 7. Flame retardant foam 700 essentially completely covers roof 201, wall 202, and wall 203 (other walls not seen) of house 100. The information is used to generate a decision to activate the system without human intervention and without manually instructing the system to activate and distributing flame retardant foam onto the roof and onto each wall through an opening in the plenum associated with that surface in response to an instruction to activate the fire suppression foam system.

Any suitable foam-forming system may be used in embodiments of the disclosure. For example, protection of a structure against intrusion of a wild fire likely would call for a Class A foam. Such foams typically are aqueous foams, like the embodiment described herein, and may be suitable for use in the pressurized distribution system described herein as a suitable embodiment of the disclosure.

Typically, a fire initiating outside a structure would not present complicating factors such as the need to protect alcohol-containing liquids, hydrocarbon liquids, and other products that preclude use of aqueous foams. However, if these complicating features are present, or if a fire started in the exterior was likely to gain access to the interior, a different class of foam could be considered. If, for example, the structure to be protected is a lean-to under which one of these liquids is stored, a different foam product might be more appropriately used. The skilled practitioner will be able to select a suitable flame retardant foam-forming product for the application at hand.

The various parts of foam distribution system 200 and the various parts of foam generation system 250 may be made of any suitable material. For example, typically, plastic or polymeric parts might be suitable for water delivery to blending components for aqueous foams. Polymers, metals, and other materials of construction may be utilized and selected in accordance with the requirements of the foam dispensing system.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method for suppressing fire in a structure having at least one roof and at least one wall, the method comprising:
- combining a foam chemical and water to form a foam solution;
- introducing air into the foam solution;
- forming a flame retardant foam by introducing the foam solution and air into an expansion chamber;
- supplying the flame retardant foam to a roof plenum;
- distributing the flame retardant foam onto an outer surface of the roof through an opening from the roof plenum to the roof, the opening being located at a ridge of the roof;
- distributing the flame retardant foam onto an outer surface of the at least one wall through the opening from the roof plenum to the at least one wall; and
- spreading the flame retardant foam laterally across a width of the outer surface of the at least one wall by flowing the foam downward over a distributor, the distributor comprising a plurality of static divider structures.

2. The method of claim 1, wherein the method further comprises:
- supplying the flame retardant foam to a soffit plenum; and
- distributing the flame retardant foam onto an outer surface of the at least one wall through an opening from the plenum to the at least one wall.

3. The method of claim 1, wherein
- the distributor is configured such that the foam is spread laterally across an entirety of the wall.

4. The method of claim 1, further comprising spreading the flame retardant foam across a plurality of secondary dividers located away from the distributor on the outer surface of the wall.

5. The method of claim 1, wherein the method further comprises:
- storing the foam chemical in a foam chemical storage container that is in fluid communication with a foam solution storage container;
- combing the foam chemical and the water to form the foam solution in the foam solution storage container;
- controlling a first compressed air line with a system control module, the first compressed air line being in fluid communication with the system control module;
- controlling a first foam solution conduit with the system control module, the first foam solution conduit being in fluid communication with the system control module and the foam solution storage container;
- wherein the step of introducing air into the dilute solution includes controlling a rate of air flow from the first compressed air line into the system control module and controlling a rate of flow of the foam solution from the first foam solution conduit.

6. The method of claim 5, wherein
- the step of controlling the rate of air flow from the first compressed air line and the step of controlling the rate of flow of the foam solution from the first foam solution conduit includes the system control module receiving electronic instructions from an electrical control module.

7. A method for suppressing fire in a structure having a plurality of surfaces to be protected from fire, the method comprising:
- supplying flame retardant foam to a plenum for each of the plurality of surfaces to be protected;
- gathering first information related to the fire;
- gathering second information related to activation of one or more neighboring fire suppression systems;
- gathering third information from system sensors;
- automatically generating a decision without human intervention to distribute the flame retardant foam onto one of the plurality of surfaces through an opening in the plenum associated with that surface in response to the first information, the second information, and the third information; and
- wherein the method further comprises:
- controlling a first compressed air line with a system control module, the first compressed air line being in fluid communication with the system control module;
- controlling a first foam solution conduit with the system control module, the first foam solution conduit being in fluid communication with the system control module and a foam solution storage container; and
- controlling a rate of air flow from the first compressed air line into the system control module and controlling a rate of flow of the foam solution from the first foam solution conduit based on electronic instructions received by the system control module from an electrical control module.

8. The method of claim 7, wherein the system sensors collect environmental data.

9. The method of claim 8, wherein the environmental data includes ambient temperature and temperature of a surface.

10. The method of claim 9, wherein the environmental data further includes wind information.

11. The method of claim 9, wherein the environmental data further includes ambient light level.

12. The method of claim 7, wherein the electrical control module is controlled by a communication line and a power supply line.

13. The method of claim 7, wherein the system control module further controls second foam solution flow in a second foam solution conduit, the second foam solution conduit being in fluid communication with the system control module and a foam expansion chamber;

the system control module further controls second compressed air flow in a second compressed air line, the second compressed air line being in fluid communication with the system control module and a foam expansion chamber; and wherein the second foam solution flow and the second compressed air flow are supplied to the foam expansion chamber and combined therein.

14. A method for suppressing a fire outside of a structure, the method comprising:

storing a foam chemical in a foam chemical storage;

mixing in a foam solution storage container the foam chemical with water from a water supply that is in fluid communication with the foam solution storage container to form a first foam solution;

transferring the first foam solution from the foam solution storage container to a system control module;

mixing the first foam solution with first compressed air in the system control module to form a second foam solution;

transferring the second foam solution from the system control module to an expansion chamber;

mixing the second foam solution with second compressed air in the expansion chamber to form a flame retardant foam;

supplying the flame retardant foam from the expansion chamber to a plenum; and distributing the flame retardant foam onto an outer surface of the structure through the plenum.

15. The method of claim 14, wherein the step of mixing the foam solution with compressed air in the system control module includes:

the system control module receiving electronic instructions from an electrical control unit.

16. The method of claim 15, wherein wherein the electrical control unit is controlled by a communication line and a power supply line.

17. The method of claim 16, wherein the communication line delivers electronic information collected from one or more system sensors.

18. The method of claim 17, wherein the one or more system sensors collect at least one of environmental data, ambient temperature, temperature of a surface, wind information, and ambient light level.

19. The method of claim 17, wherein the one or more system sensors are located on-site at the structure.

20. The method of claim 17, wherein the one or more system sensors and the electrical control unit are configured to activate the system control module to dispense the first foam solution from the system control module to the expansion chamber independent of human intervention.

* * * * *